United States Patent [19]

Konopka

[11] Patent Number: 4,856,078

[45] Date of Patent: Aug. 8, 1989

[54] DC FAN SPEED CONTROL

[75] Inventor: John G. Konopka, Barrington, Ill.

[73] Assignee: Zenith Electronics Corporation, Glenview, Ill.

[21] Appl. No.: 172,734

[22] Filed: Mar. 23, 1988

[51] Int. Cl.$^4$ .............................................. H02P 7/29
[52] U.S. Cl. .................................... 388/831; 388/934; 318/599
[58] Field of Search ............... 318/138, 254, 301, 317, 318/334, 341, 439

[56] References Cited

U.S. PATENT DOCUMENTS

| | | | |
|---|---|---|---|
| 3,260,912 | 7/1966 | Gregory | 318/341 |
| 4,015,182 | 3/1977 | Erdman | 318/334 |
| 4,105,938 | 8/1978 | Mathews | 318/599 |
| 4,129,808 | 12/1978 | Bregeault et al. | 318/254 |
| 4,216,418 | 8/1980 | Wagensonner et al. | 318/341 |
| 4,291,259 | 9/1981 | Marumoto et al. | 318/341 X |
| 4,325,011 | 4/1982 | Peterson | 318/341 X |
| 4,347,468 | 8/1982 | Wilke | 318/317 X |
| 4,356,438 | 10/1982 | Iwasaki | 318/344 |
| 4,458,183 | 7/1984 | Neilson | 318/341 X |
| 4,459,087 | 7/1984 | Barge | 417/356 |
| 4,506,199 | 3/1985 | Asche | 318/313 |
| 4,553,075 | 11/1985 | Brown et al. | 318/254 |
| 4,618,806 | 10/1986 | Grouse | 318/254 |
| 4,638,223 | 1/1987 | Tajima et al. | 318/254 |
| 4,656,553 | 4/1987 | Brown | 361/31 |
| 4,659,290 | 4/1987 | Kundert | 417/32 |
| 4,700,116 | 10/1987 | Inoue et al. | 318/254 |
| 4,722,669 | 2/1988 | Kundert | 318/334 |

OTHER PUBLICATIONS

"Self–Contained Speed Controller Allows DC Fans to Idle at One–Half Rated Speed", Control Resources Inc., Smart Fan Div, Box 315, Harvard, MA 01451, phone (617)456-8763.

Primary Examiner—Bentsu Ro

[57] ABSTRACT

A simple pulse width modulator speed control for a brushless DC "pancake" type fan motor utilizes a type 555 timer for driving a transistor switch, connected in series between the DC voltage supply and the fan motor, at about a 10 Hz rate. The duty cycle of the pulsed output of the timer is controllable by a variable resistor, which in the preferred embodiment comprises a thermistor for controlling the fan speed as a function of temperature. The fan motor is restarted on each cycle of full voltage amplitude pulses and consequently will start under all operating conditions.

3 Claims, 1 Drawing Sheet

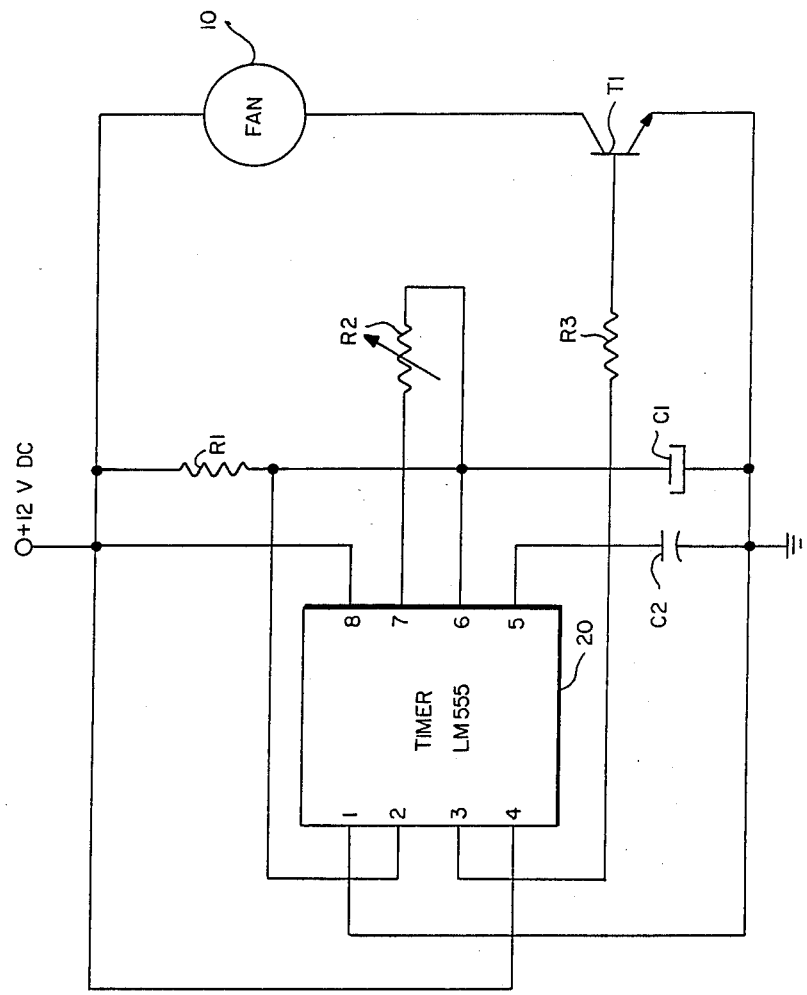

DC FAN SPEED CONTROL

BACKGROUND OF THE INVENTION AND PRIOR ART

This invention relates generally to speed controls for DC fans and particularly to a low cost speed control for a small, brushless "pancake" type DC fan.

With the rapid proliferation of computers and computer related equipment, the small brushless DC fan of "pancake" or flat configuration has proven enormously popular for providing ventilation because of its small size, straight flow through design and installation flexibility. A long recognized problem is that of fan operating noise, which may become objectionable since such fans are generally selected for "worst case" conditions, i.e. to deliver maximum cooling. Often the ambient temperature and/or loading demands on the equipment are such that significantly less cooling is required. Consequently the fan could operate at a lower speed and the operating noise of the fan running at high speed is unnecessarily disturbing.

There have been a number of prior art solutions and attempted solutions to this problem. Motor speed controls, for example, have been available for many years and have been applied in many different environments. Fan speed controls are also well known in the art, although mainly for controlling AC motors. A brushless DC fan motor involves further difficulties in that it loses torque at lower than normal operating voltages and may become very unreliable. Also, prior art control circuits for controlling the speed of a brushless DC fan motor are relatively complex and expensive.

With the invention, a very simple, conpact, DC fan speed control is provided that uses a minimum number of readily available, low cost components. The speed control of the invention may be mounted in inconspicuous places because of its compact size and low heat dissipation. Further, the inventive device reliably controls the speed of the fan over a wide range, while retaining full torque electrical input.

OBJECTS OF THE INVENTION

A principal object of the invention is to provide a novel DC fan motor speed control.

Another object of the invention is to provide a low cost, reliable DC fan speed control of enhanced characteristics.

BRIEF DESCRIPTION OF THE DRAWING

These and other objects and advantages of the invention will be apparent upon reading the following description in conjunction with the drawing, the single FIGURE of which is a schematic diagram of a speed control system constructed in accordance with the invention.

DESCRIPTION OF THE PREFERRED EMBODIMENT

Referring to the drawing, a brushless DC fan motor 10 of pancake type construction is connected in series with a source of +12 volts DC, the emitter-collector junction of a PNP type switch transistor T1, and ground. An integrated circuit type 555 timer 20 is connected as indicated. Its #1 terminal is connected to ground, its #2 terminal is connected to the +12 volt voltage source through a resistor R1, its #3 terminal is connected to the base of transistor T1 through a resistor R3, its #4 and #8 terminals are connected directly to the voltage source, its #5 terminal is connected to a capacitor C2 and its #6 and #7 terminals are connected to a variable resistor R2. An electrolytic capacitor C1 is connected between ground and the #6 and #2 terminals of timer 20.

As mentioned, timer 20 is a type 555, which will be recognized as a durable, low cost, readily available "off the shelf" device. Transistor T1 is an NPN type 2N4401, R1 is 10 kilohms, R2 is a 5 kilohm thermistor, R3 is 100 ohms, C1 is 10 microfarads and C2 is 0.01 microfarads. DC fan motor 10 is rated at a nominal 12 volts DC and may draw currents up to ½ ampere.

The circuit of the invention functions to vary the fan motor speed by controlling the duty cycle of voltage pulses delivered thereto. Timer 20 oscillates at about a 10 Hz rate to deliver 10 Hz pulses of voltage of substantially constant amplitude to the base of transistor T1. Thus fan motor 10 is supplied with pulses of current of constant voltage at a 10 Hz rate. The fan motor is literally turned on and off at a 10 Hz rate. Each "turn on" is at full torque since the applied voltage is constant. The motor 10 is started and permitted to coast ten times per second with the duty cycle of the current being varied to control the ON times. In effect, the circuit is a pulse width modulator (PWM) that supplies constant voltage pulses of current of variable duty cycle (at a 10 Hz rate) to fan motor 10.

Most low voltage brushless DC fans employ Hall effect switching, along with other electronics, which insure start-up and provide protection against a stalled rotor. Due to the nature of these fans, a pulse width modulation frequency higher than 20 Hz would not allow enough time, at lower duty cycles, for the fan to start and for the internal electronics to operate properly. This is the primary reason for using 10 Hz as the operatintg frequency in the invention. With a duty cycle of 30 percent the on time is 30 Ms which is long enough for the fan and it internal electronics to perform normally.

The fan speed is controlled by allowing the fan motor to coast. Internal friction and the braking effect of the air flowing over the blades act to slow the fan motor. The amount of time required to bring the fan up to full speed is quite short compared to the time it takes for the fan to stop rotating after power is removed.

Most motor speed controls employ complex feedback circuits to maintain constant speed under varying load conditions. With a fan this is not necessary since only the average speed is important. Thus, in accordance with the invention the speed is controlled in a simple manner by applying power long enough to exceed the desired speed by about 10 percent and then by removing power long enough for a speed to fall below the desired speed by about 10 percent. The volume of air moved and the noise level is determined by the average of these two speeds.

R2 is variable and determines the duty cycle of the current delivered to fan motor 10. In the preferred form of the invention the duty cycle may be varied between 30 and 90 percent. R2 may be either manually or automatically varied in response to temperature changes. In the temperature controlled fan embodiment, R2 is a thermistor. In this embodiment R2 is positioned to sense the ambient air temperature, so that its resistance will reflect that temperature and modify the duty cycle of the current supplied to fan motor 10. In this way, the speed of fan motor 10 may be continuously controlled to provide adequate cooling with a minimum of noise, i.e. at the lowest speed. Fan motor 10 will operate satisfactorily with a voltage as low as 8 VDC and is independent of the rise time of the DC voltage for start up. Even if the fan is stalled, it will restart under all conditions since constant amplitude voltage pulses are applied to it at the 10 Hz rate.

A feature readily incorporated into the speed control of the invention is an automatic shutoff that stops the fan motor when the temperature drops to a preset level, for example 20° Centigrade. If the value of R2 becomes less than one half the value of R1, the oscillator (timer 20) will shut down and the fan motor will stop. If that feature is not desired, the value of R1 may be reduced so that R2 will not be one-half of R1 at the given temperature.

What has been described is a novel, low cost, reliable speed control circuit for a brushless type DC pancake fan. It is recognized that numerous modifications and changes in the described embodiment of the invention will be apparent to those skilled in the art without departing from its true spirit and scope. The invention is to be limited only as defined in the claims.

What is claimed is:

1. A speed control for a DC fan motor comprising:
    a source of DC voltage;
    a switch transistor connected in series with said motor and said voltage source;
    a type 555 timer including an RC circuit coupled to said voltage source for developing a constant amplitude pulsed voltage output;
    means for operating said switch transistor which said pulsed voltage output; and
    means for varying the on/off cycle of said timer, said RC circuit including a thermistor for changing the speed of said motor as a function of temperature, said speed control consisting of two capacitors and two resistors in addition to said switch transistor said 555 timer, and said thermistor.

2. The speed control of claim 1 wherein said on/off cycle is variable from approximately 30 percent to 90 percent at a 10 Hz rate.

3. A speed control for a brushless DC fan motor comprising:
    a source of DC voltage;
    a switch transistor having a base and an emitter-collector path connected in series with said voltage source and said motor;
    a type 555 timer coupled to said DC voltage source and to said base of said switch transistor, said timer supplying constant amplitude voltage pulses to said transistor at approximately a 10 Hz rate;
    an RC circuit coupled to said timer for varying the duty cycle thereof; and
    a thermistor in said RC circuit for controlling the speed of said motor as a function of temperature.

* * * * *